(12) United States Patent
Lin

(10) Patent No.: US 6,692,037 B1
(45) Date of Patent: Feb. 17, 2004

(54) FLAT WATER HOSE AND HOSE CONNECTORS FOR FLAT WATER HOSE

(75) Inventor: Pei-Ying Lin, Taichung Hsien (TW)

(73) Assignee: Global Industries Holdings Ltd., New Providence (BS)

( * ) Notice: Subject to any disclaimer, the term of this patent is extended or adjusted under 35 U.S.C. 154(b) by 0 days.

(21) Appl. No.: 10/282,391

(22) Filed: Oct. 30, 2002

(51) Int. Cl.[7] .................................................. F16L 47/00
(52) U.S. Cl. .............................. 285/124.1; 285/124.4; 138/115
(58) Field of Search ........................... 285/124.1, 124.2, 285/124.3, 124.4, 124.5, 246, 247; 138/115, 116, 117

(56) References Cited

U.S. PATENT DOCUMENTS

| | | | | |
|---|---|---|---|---|
| 355,867 A | * | 1/1887 | Denison | 174/37 |
| 2,151,540 A | * | 3/1939 | Varga | 138/117 |
| 3,648,768 A | * | 3/1972 | Scholl | 165/171 |
| 4,043,015 A | * | 8/1977 | Hickman et al. | 165/173 |
| 4,345,786 A | * | 8/1982 | Egert | 285/124.4 |
| 4,599,171 A | * | 7/1986 | Padilla et al. | 210/257.2 |
| 4,722,559 A | * | 2/1988 | Bongartz | 285/122.1 |
| 4,975,055 A | * | 12/1990 | LaPlante | 433/82 |
| 5,501,840 A | * | 3/1996 | Mantovani et al. | 422/101 |
| 5,725,485 A | * | 3/1998 | Ribando et al. | 601/152 |
| 5,768,824 A | * | 6/1998 | Matz | 47/33 |
| 6,453,950 B1 | * | 9/2002 | Smith | 138/115 |
| D475,439 S | * | 6/2003 | Ln | D23/266 |

* cited by examiner

Primary Examiner—Eric K. Nicholson
(74) Attorney, Agent, or Firm—Charles E. Baxley

(57) ABSTRACT

A flat water hose is disclosed having a plurality of water passages arranged in parallel and extended through two distal ends of the body of flat cross section thereof, and two hose connectors at the ends of the body of flat cross section for connection to a water tap and a sprinkler respectively.

9 Claims, 4 Drawing Sheets

FLAT WATER HOSE AND HOSE CONNECTORS FOR FLAT WATER HOSE

BACKGROUND OF THE INVENTION

1. Field of the Invention

The present invention relates to water hoses and, more specifically, to a flat water hose having parallel water passages. The invention relates also to hose connectors adapted to connect the flat water hose to a water tap or sprinkler. The hose connectors enable a plurality of flat water hoses to be connected in a line.

2. Description of the Related Art

Conventional plastic water hoses are tubular members defining a water passage for delivering water. When a water hose is used, it is preferably fully extended out, preventing twisting. When a water hose twisted, the water passage is narrowed, reducing the output flow rate. Further, when a water hose is frequently twisted at the same area, a memory of deformation may occur. When a memory of deformation occurred, the water hose tends to be twisted at the same area. If the twisted section of the water hose is not straightened, the water hose may be permanently deformed, affecting output of water. Further, when rolling up a water hose, the hose wall must be maintained smoothly curved, keeping the water passage in a fully open status so as to prevent twisting or deformation of the hose wall. Further, when a water hose rolled up in a roll or wound round a hose reel, it still occupies much storage space.

SUMMARY OF THE INVENTION

The present invention has been accomplished under the circumstances in view. It is the main object of the present invention to provide a flat water hose, which has a reinforced wall structure that prevents twisting or deformation of the hose wall. It is another object of the present invention to provide hose connectors for flat water hose, which enables the flat water hose to be conveniently and detachably fastened to the water tap or sprinkler. According to one aspect of the present invention, the flat water hose has a flat cross section, and a plurality of water passages arranged in parallel and extended through the two distal ends. According to another aspect of the present invention, the flat water hose has two longitudinal reinforcing ribs horizontally and outwardly protruded from the periphery thereof at two opposite sides and extended between the two distal ends. According to still another aspect of the present invention, the hose connector for flat water hose comprises a mounting base member, the mounting base member having a mounting hole in one end thereof for receiving one end of the flat water hose and a receiving chamber in an opposite end thereof; a connecting member adapted to connect the mounting base member to a fitting; and a plug member adapted to secure the connecting member and the mounting base member to the flat water hose, the plug member comprising a cup-like hollow shell, the cup-like hollow shell having a close side and an open side, and a plurality of tubular plug rods respectively extended from the close side of the cup-like hollow shell in fluid communication with the inside space of the cup-like hollow shell for inserting into the water passages of the flat water hose to secure one end of the flat water hose to the inside of the mounting hole of the mounting base member.

DETAILED DESCRIPTION OF THE PREFERRED EMBODIMENT

Figures 1A, 1B:
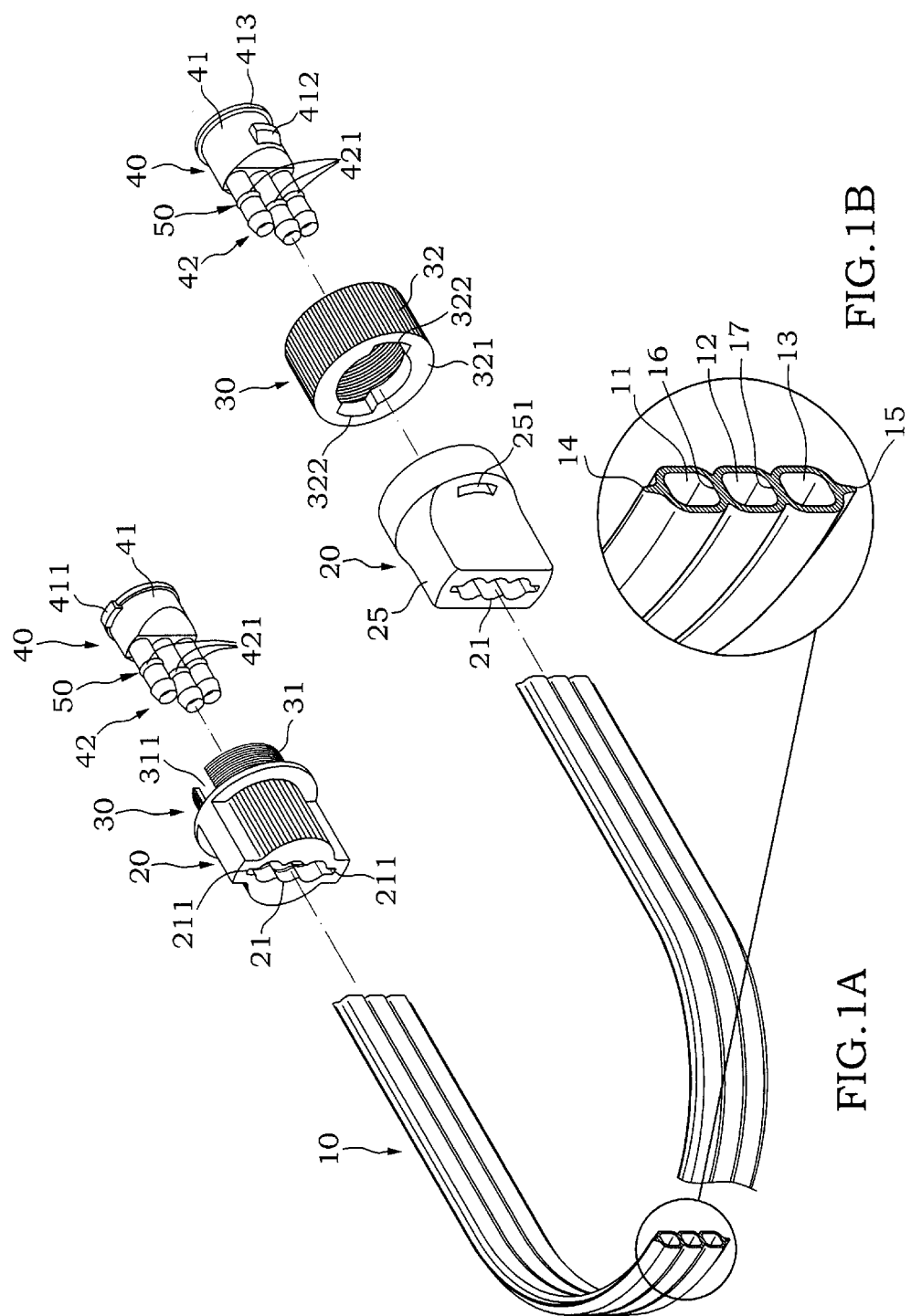
FIG. 1A is an exploded view of the present invention.
FIG. 1B is an enlarged view of a part of FIG. 1A, showing the internal structure of the flat water hose.

Referring to FIGS. 1A and 1B, the water hose, referenced by 10, is made of flexible PVC (polyvinyl chloride, having parallel water passages 11, 12, and 13, longitudinally extended through two distal ends thereof, and two longitudinal reinforcing ribs 14 and 15 horizontally and outwardly protruded from the periphery at two opposite sides and extended along the length. The body of the water hose 10 has a flat cross section.

The partition walls 16 and 17 between the water passages 11, 12, and 13 form an internal supporting structure of the water hose 10. Because of the effect of the partition walls 16 and 17, the water hose 10 will not easily be flattened when receiving an external pressure. Further, the longitudinal reinforcing ribs 14 and 15 reinforce the outside walls of the two opposite outer water passages 11 and 13, preventing deformation of the lateral sides of the water hose 10. Therefore, the water passages 11, 12, and 13 of the water hose 10 are constantly maintained fully opened. Under normal use, the water hose 10 will not easily be twisted or permanently deformed. Because the water passages 11, 12, and 13 of the water hose 10 are constantly maintained fully opened, maximum water output of the water hose 10 can be achieved when desired.

Further, because the water hose 10 has a flat shape, it can easily be rolled up in a roll with less storage space occupation for delivery or storage. In case the water hose 10 has a long length, the aforesaid advantages can still be maintained.

The two ends of the water hose 10 are respectively provided with a respective hose connector. The hose connector at one end of the water hose 10 is adapted to connect the water hose 10 to a water faucet. The hose connector at the other end of the water hose 10 is adapted to connect the water hose 10 to a sprinkler or the like. The hose connector may be variously embodied.

Figure 2:
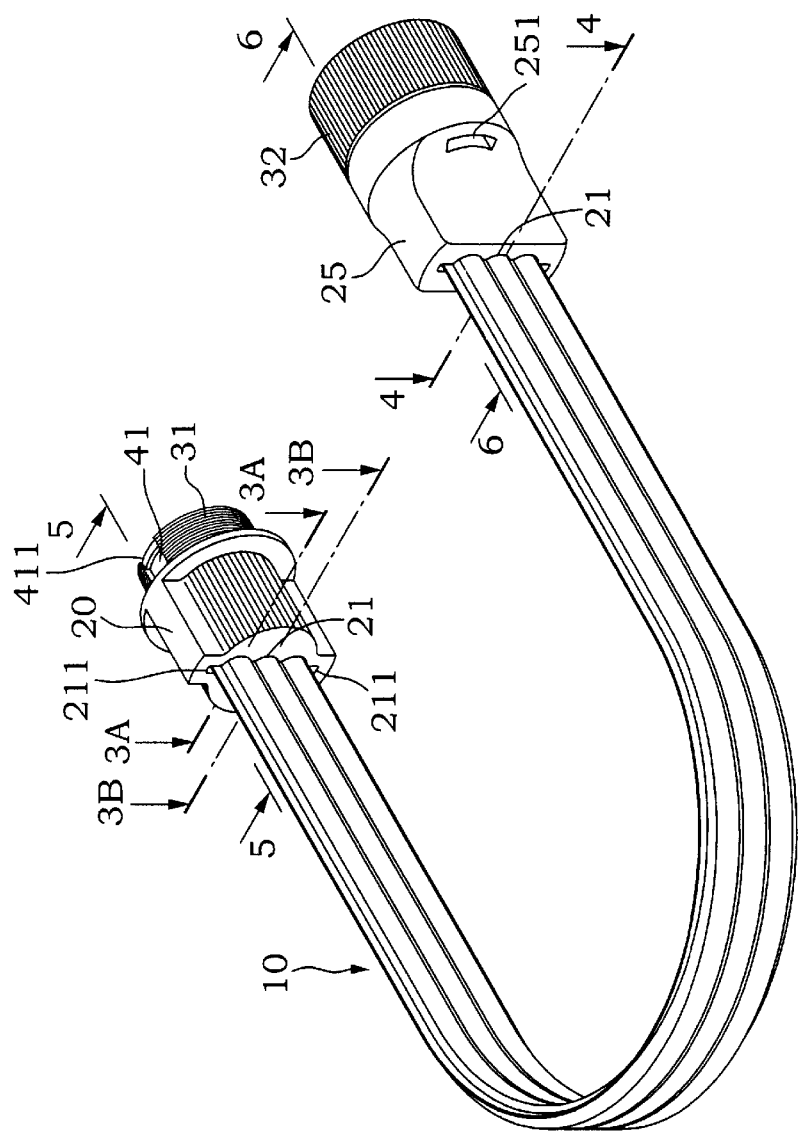
FIG. 2 is an assembly view of FIG. 1A.
Figure 5:
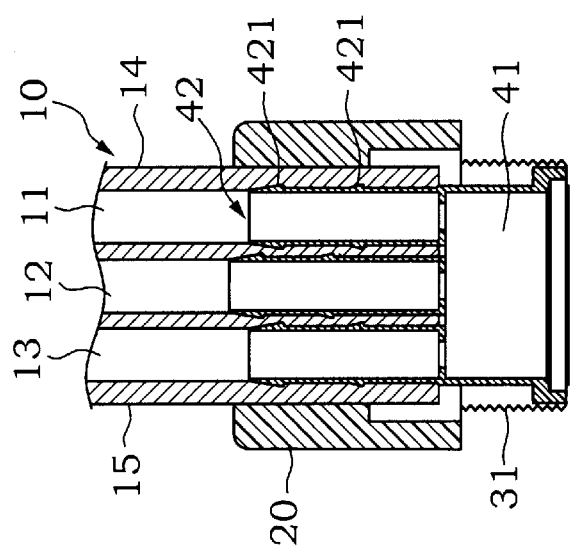
FIG. 5 is a sectional view, in an enlarged scale, taken along line 5—5 of FIG. 2.
Figure 3B:
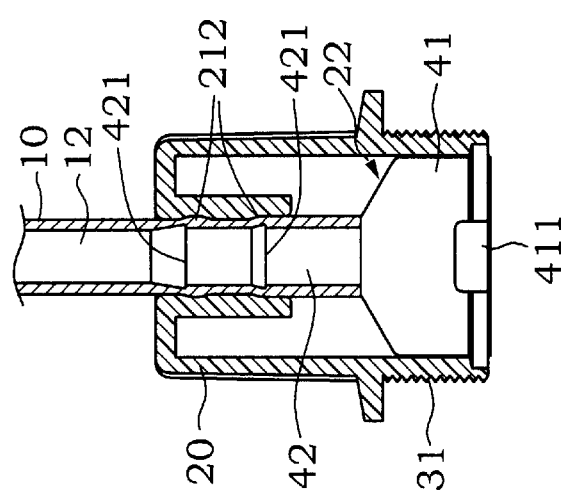
FIG. 3B is a sectional view, in an enlarged scale, taken along line 3B—3B of FIG. 2.
Figure 3A:
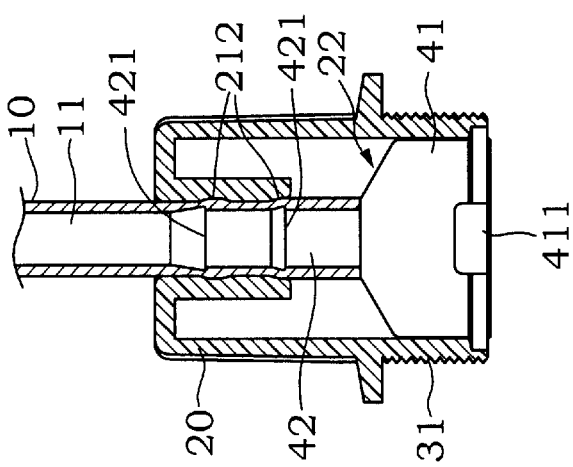
FIG. 3A is a sectional view, in an enlarged scale, taken along line 3A—3A of FIG. 2.
Figure 4:
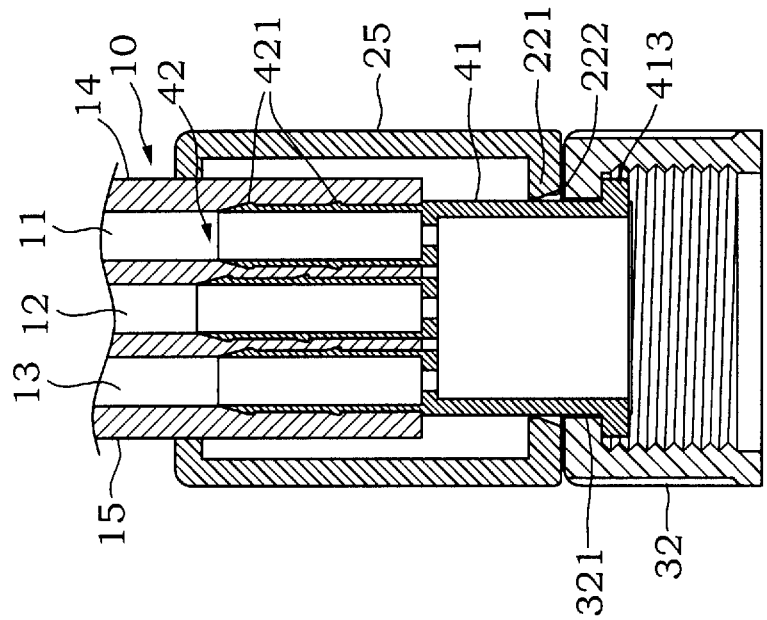
FIG. 4 is a sectional view, in an enlarged scale, taken along line 4—4 of FIG. 2.
Figure 6:
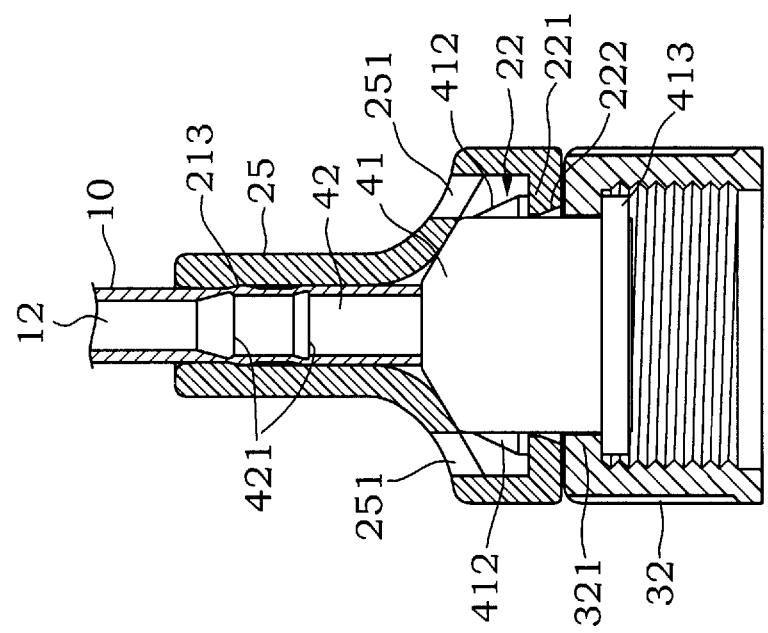
FIG. 6 is a sectional view, in an enlarged scale, taken along line 6—6 of FIG. 2.

Referring to FIG. 2 and FIG. 1A again, the hose connector is comprised of a mounting base member 20, a connecting member 30, a plug member 40, and a sealing and positioning structure 50. The mounting base member 20 has a mounting hole 21 disposed in one end and adapted to receive one end of the water hose 10, and a receiving chamber 22 disposed in the other end (see FIGS. 3A and 4). The mounting hole 21 has two side portions 211 adapted to receive the reinforcing ribs 14 and 15 of the water hose 10. The connecting member 30 is located on one end of the mounting base member 20 remote from the mounting hole 21. The plug member 40 comprises a cup-like hollow shell 41 having an open side and a close side, and a plurality of tubular plug rods 42 respectively extended from the close side of the cup-like hollow shell 41 in fluid communication with the inside space of the cup-like hollow shell 41. The tubular plug rods 42 of the plug member 40 are inserted through the socket 30 into the water passages 11, 12, and 13 of the water hose 10 respectively to hold down the corresponding end of the water hose 10 in the mounting hole 21 of the mounting base member 20, keeping the cup-like hollow shell 41 received in the receiving chamber 22 of the mounting base member 20. The sealing and positioning structure 50 is provided between the tubular plug rods 42 of the plug member 40 and the peripheral wall of the mounting hole 21 of the mounting base member 20, and adapted to secure the mounting base member 20 to the corresponding end of the water hose 10.

As indicated above, the aforesaid hose connector may be variously embodied. According to the first embodiment of the present invention as shown in FIGS. 1A, 2, 3A, 3B, and 5, the connecting member 30 of the hose connector is a stub screw tube 31 formed integral with one end of the mounting base member 20 around the receiving chamber 22 for threading into the inner thread of a water tap or sprinkler, having two locating notches 311 at two sides; the plug member 40 has two locating blocks 411 located on two sides of the cup-like hollow shell 41 and respectively engaged into the locating notches 311 of the stub screw tube 31. The sealing and positioning structure 50 comprises a plurality of annular locating flanges 421 respectively formed integral with the periphery of each of the tubular plug rods 42 of the plug member 40, and a plurality of locating grooves 212 formed in the inside wall of the mounting base member 20 around the mounting hole 21. When the tubular plug rods 42 inserted into the mounting hole 21 of the mounting base member 20 and plugged into the water passages 11, 12, and 13 of the water hose 10, the annular locating flanges 421 force the peripheral wall of the water hose 10 radially outwards into engagement with the locating grooves 212, and therefore the mounting base member 20 is firmly secured to the corresponding end of the water hose 10. Further, the annular locating flanges 421 are formed in the tubular plug rods 42 of the plug member 40 in a staggered manner, i.e., the annular locating flanges 421 of each two adjacent tubular plug rods 42 are not aligned in a line, preventing interference of the annular locating flanges 421 with one another during installation.

According to the second embodiment of the present invention as shown in FIGS. 1A, 2, 4, and 6, the connecting member 30 of the hose connector is a lock nut 32 for threading into the outer thread of a water tap or sprinkler. The lock nut 32 is an independent member separated from the mounting base member 20. The mounting base member 20 comprises a body 25, a mounting hole 21 in one end of the body 25, a receiving chamber 22 in the other end of the body 25, and an inside annular flange 221 in one end of the peripheral wall of the receiving chamber 22. The inside annular flange 221 has a beveled guide edge 222 in the inner diameter. The lock nut 32 has an inwardly extended annular stop flange 321 in one end, and two notches 322 in the annular stop flange 321 at two sides. The plug member 40 comprises a cup-like hollow shell 41 having an open side and a close side, a plurality of tubular plug rods 42 respectively extended from the close side of the cup-like hollow shell 41 in fluid communication with the inside space of the cup-like hollow shell 41, an outside annular stop flange 413 extended around the open side of the cup-like hollow shell 41, and two engagement blocks 412 of triangular cross section symmetrically protruded from the periphery of the cup-like hollow shell 41 at two sides.

The assembly of the second embodiment of the hose connector is outlined hereinafter. The respective end of the water hose 10 is inserted into the mounting hole 21 of the body 25 of the mounting base member 20, and then plug member 40 is inserted through the lock nut 32 for enabling the engagement blocks 412 to pass through the notches 322 in the annular stop flange 321 of the lock nut 32 and the outside annular stop flange 413 of the plug member 40 to be stopped at the annular stop flange 321 inside the lock nut 32, and then the cup-like hollow shell 41 of the plug member 40 is inserted into the body 25 of the mounting base member 20 for enabling the tubular plug rods 42 of the plug member 40 to be respectively press-fitted into the water passages 11, 12, and 13 of the water hose 10. By means of the guide of the beveled guide edge 222, the engagement blocks 412 are moved over the inside annular flange 221 into the inside of the receiving chamber 22 of the body 25 of the mounting base member 20. When passed, the engagement blocks 412 are stopped behind the inside annular flange 221. At this time, the inside annular flange 221 of the mounting base member 20 and the annular stop flange 321 of the lock nut 32 are stopped between the engagement blocks 412 and outside annular stop flange 413 of the plug member 40, and the lock nut 32 is allowed to be rotated relative to the mounting base member 20.

Further, according to the second embodiment of the present invention, the sealing and positioning structure 50 comprises a plurality of annular locating flanges 421 respectively formed integral with the periphery of each of the tubular plug rods 42 of the plug member 40, and a sloping surface portion 213 in the mounting hole 211. When the tubular plug rods 42 press-fitted into the water passages 11, 12, and 13 of the water hose 10, the annular locating flanges 421 force the peripheral wall of the water hose 10 radially outwards against the sloping surface portion 213, and therefore the mounting base member 20 is firmly secured to the corresponding end of the water hose 10.

Further, the body 25 of the mounting base member 20 has two side holes 251 corresponding to the engagement blocks 412 of the plug member 40. The user can insert a tool into one side hole 251 to deform the corresponding engagement block 412 and the cup-like hollow shell 41 (according to the present invention, the plug member 40 is injection-molded from plastics), for enabling the engagement blocks 412 to be disengaged from the inside annular flange 221 of the mounting base member 20, so that the plug member 40 and the lock nut 30 can be separated from the mounting base member 20.

The hose connector according to the first embodiment of the present invention is suitable for connection to the inner thread of a spray nozzle or sprinkler. During installation, the spray nozzle or sprinkler is directly threaded onto the outer thread of the stub screw tube of the connecting member. Therefore, connecting the hose connector to the spray nozzle or sprinkler does not cause the water hose to be twisted. The hose connector according to the second embodiment of the present invention is suitable for fastening to a water tap. By means of the lock nut, the hose connector can be positively secured to the water tap without twisting the water hose.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A hose connector mounted on one end of a flat water hose having parallel water passages extended through ends of the flat water hose and adapted to connect said flat water hose to a fitting, the hose connector comprising:

a mounting base member, said mounting base member having a mounting hole in one end thereof for receiving one end of the flat water hose and a receiving chamber in the opposite end thereof;

a connecting member adapted to connect said mounting base member to a fitting;

a plug member adapted to secure said connecting member and said mounting base member to said flat water hose, said plug member comprising a cup-like hollow shell, said cup-like hollow shell having a closed side and an open side, and a plurality of tubular plug rods respectively extended from the closed side of said cup-like hollow shell in fluid communication with the inside space of the cup-like hollow shell for insertion into the water passages of said flat water hose to secure one end of said flat water hose to the inside of the mounting hole of said mounting base member;

said connecting member being a stub screw tube formed integrally with one end of said mounting base member around said receiving chamber for threading into the inner thread of a fitting;

said stub screw tube having at least one locating notch, said plug member having at least one locating block protruding from the periphery of said cup-like hollow shell and respectively engaged into the at least one locating notch of said stub screw tube.

2. The hose connector as claimed in claim 1, further comprising a sealing and positioning structure provided between said tubular plug rods of said plug member and an inside wall of said mounting base member around said mounting hole, and adapted to secure said mounting base member to the end of said water hose being inserted into the mounting hole of said mounting base member.

3. The hose connector as claimed in claim 1, wherein said sealing and positioning structure comprises a plurality of annular locating flanges respectively formed integrally with the periphery of each of said tubular plug rods of said plug member, and a plurality of locating grooves formed in the inside wall of said mounting base member around said mounting hole corresponding to said annular locating flanges.

4. The hose connector as claimed in claim 3, wherein said annular locating flanges are arranged on said tubular plug rods of said plug member in a staggered manner.

5. The hose connector as claimed in claim 4, wherein said plug member has an outside annular stop flange extended around the open side of said cup-like hollow shell and stopped at one side of the inwardly extended annular stop flange of said lock nut opposite to said mounting base member, and two engagement blocks of triangular cross section symmetrically protruding from the periphery of said cup-like hollow shell at two sides and stopped at one side of the inside annular flange of said mounting base member opposite to said lock nut.

6. The hose connector as claimed in claim 5, wherein the inwardly extended annular stop flange of said lock nut has two notches symmetrically disposed at two sides for the passing of the engagement blocks of said plug member upon insertion of said plug member into said lock nut and said mounting base member.

7. The hose connector as claimed in claim 6, wherein the inside annular flange of said mounting base member has a beveled guide edge adapted to guide the engagement blocks of said plug member over the inside annular flange of said mounting base into the inside of said receiving chamber of said mounting base member.

8. The hose connector as claimed in claim 7, wherein said sealing and positioning structure comprises a plurality of annular locating flanges respectively formed integrally with the periphery of each of said tubular plug rods of said plug member, and a sloping surface portion formed in said mounting hole of said mounting base member corresponding to the annular locating flanges at said tubular plug rods of said plug member.

9. The hose connector as claimed in claim 5, wherein said mounting base member has two side holes corresponding to the engagement blocks of said plug member.

* * * * *